(12) United States Patent
Nijmeijer et al.

(10) Patent No.: US 6,632,360 B1
(45) Date of Patent: Oct. 14, 2003

(54) SEPARATING DEVICE COMPRISING A CERAMIC MEMBRANE

(75) Inventors: Arian Nijmeijer, Enschede (NL); Hendrik Kruidhof, Hengelo (NL); Hendrik Verweij, Enschede (NL)

(73) Assignee: Universiteit Twente, Enschede (NL)

( * ) Notice: Subject to any disclaimer, the term of this patent is extended or adjusted under 35 U.S.C. 154(b) by 0 days.

(21) Appl. No.: 09/787,152

(22) PCT Filed: Aug. 30, 1999

(86) PCT No.: PCT/NL99/00537

§ 371 (c)(1),
(2), (4) Date: May 11, 2001

(87) PCT Pub. No.: WO00/15326

PCT Pub. Date: Mar. 23, 2000

(30) Foreign Application Priority Data

Sep. 15, 1998 (NL) ............................................. 1010097

(51) Int. Cl.⁷ ............................................. B01D 39/14
(52) U.S. Cl. ............ 210/500.25; 210/490; 210/500.26; 210/321.6; 55/523; 55/524
(58) Field of Search ............................ 210/490, 500.25, 210/500.26, 321.6; 55/523, 524

(56) References Cited

U.S. PATENT DOCUMENTS

| | | | |
|---|---|---|---|
| 5,753,121 A | * | 5/1998 | Geus et al. |
| 6,309,545 B1 | * | 10/2001 | Penth et al. |
| 6,383,686 B1 | * | 5/2002 | Umeno et al. |

FOREIGN PATENT DOCUMENTS

| | | | |
|---|---|---|---|
| DE | 4237604 A1 | * | 11/1994 |
| EP | 0242208 A | | 10/1987 |
| JP | 05057162 | | 3/1993 |

OTHER PUBLICATIONS

Cini P et al.; "Preparation and Characterization of Modified Tubular Ceramic Membranes for use as Catalyst Supports"; Jan. 1, 1991; Journal of Membrane Science; vol. 55, No. 1/02, pp. 199–225, p. 220, paragraph 2, p. 222, last paragraph—p. 223, last line (XP000175419 abstract).

Uhlhorn R J R et al.; "High Permselectivities of Microporous Silica–Modified Gamma–Alumina Membranes"; Jan. 1, 1989; Journal of Materials Science Letters; vol. 8, No. 22, pp. 1135–1138, (XP000198877 the whole document).

Database WPI; Section Ch; Week 9315; Derwent Publications Ltd.; London, GB; Class J01; AN 93–120517 (XP002103318, abstract).

Vch Verlag, Weinheim, De; Ullmann's Encyclopedia of Industrial Chemistry; 1991; vol. A 19 p. 500; col. 1, line 29—line 40 (XP002103316).

Römpp Chemie Lexicon; Thieme Verlag, Stuttgart, De; 1990; vol. 1, p. 140, col. 1, Line 28—line 31 (XP002103317).

Lafarga D. et al.; "Thermal Stability of Gamma–Al2O3/alpha–Al2O3 Mesoporous Membranes"; Journal of Membrane Science; Sep. 1998; vol. 147, No. 2, 2, p. 173–185; table 2 p. 173, col. 1, line 1—col. 2, line 1, p. 175, col. 1, line 12—line 15, p. 175, line 30—p. 176, col. 1, line 6, p. 180, col. 1, last paragraph—col. 2, line 40, p. 183, col. 2, line 5—p. 184, col. 1, line 9 (XP004147081 abstract).

* cited by examiner

Primary Examiner—Ana Fortuna
(74) Attorney, Agent, or Firm—Webb Ziesenheim Logsdon Orkin & Hanson, P.C.

(57) ABSTRACT

A device for separating liquid and/or gas components from each other, which device includes a ceramic membrane comprising a porous layer of γ-alumina which is present on top of a porous layer of supporting material, wherein an alkali-free, phosphorous material is provided between said supporting material and said layer of γ-alumina, and wherein said material preferably consists of monoaluminium phosphate.

11 Claims, 1 Drawing Sheet

SEPARATING DEVICE COMPRISING A CERAMIC MEMBRANE

BACKGROUND OF THE INVENTION

1. Field of the Invention

The invention relates to a device for separating liquid and/or gas components from each other, which device includes a ceramic membrane comprising a porous layer of γ-alumina which is present on top of a porous layer of supporting material, that is, the carrier, and also to the membrane used in such a device.

2. Description of the Related Art

The separation of different molecules which are present in liquids or gases is frequently an important part of industrial chemical processes. Industrial separating techniques are traditionally based on distillation, crystallisation, absorption, extractions and/or cryogenic techniques. One drawback of said techniques is the fact that they require a great deal of energy as well as significant investment.

Consequently, there is a need for separation techniques which require less energy and which can be used both on a large scale and on a small scale. In this connection, membranes are frequently used for separating or filtrating gases of liquids at a molecular level. There are various kinds of membranes, among which polymeric and ceramic membranes. Ceramic membranes are finding increasingly wide industrial application.

Some advantages of ceramic membranes in comparison with polymeric membranes are their greater thermal and chemical stability, mechanical strength, selectivity and through-flow rate.

A number of specific applications are steam sterilisation for the foodstuffs industry and the medical industry, filtration of steam containing hot waste gases in the process industry, and membrane reactors, such as steam reformers and dehydrogenation reactors.

For ultrafiltration purposes, the filter layer frequently consists of γ-alumina, a mesoporous material, which may be applied on top of a layer of macroporous α-alumina. For gas filtration purposes, a silica layer, a microporous material, may furthermore be applied to the γ-alumina layer. In that case the γ-alumina layer functions as a bridging layer between the large pores of the carrier and the very small pores of the silica layer.

One drawback of the use of this kind of ceramic membranes in the aforesaid industrial processes is their limited resistance to certain substances, such as steam, whereby the γ-alumina layer may come loose under the influence of the steam of the carrier. Said coming loose of the γ- alumina layer may also lead to the fracture of the silica layer that may be present, as a result of which the function of such a membrane will be lost.

SUMMARY OF THE INVENTION

The object of the invention is to provide a membrane having a long life, which provides a stable bond between the γ-alumina layer and the carrier.

In order to accomplish that objective, an alkali-free, phosphorous material is present between said supporting material and said layer of γ-alumina. In practice it has become apparent that such a phosphorous material is conducive towards obtaining a good bond between the two layers, which bond appears to be properly resistant to, inter alia, steam.

Preferably, said alkali-free, phosphorous material substantially consists of monoaluminium phosphate, and said supporting material consists substantially of alumina and/or titania and/or zirconia and/or silica and/or metal compounds. Such materials, which are known per se, appear to be satisfactory in practice for obtaining a stable and reliable membrane.

In one preferred embodiment, a porous top layer having smaller pores, preferably a top layer which contains silica, is present on top of said porous layers of γ-alumina, as a result of which a satisfactory gas separation filter is obtained.

The invention furthermore relates to a method for separating liquid and/or gas components from each other, wherein said liquid and/or said gas is passed through a ceramic membrane comprising a porous layer of γ-alumina which is present on a porous layer of supporting material, wherein an alkali-free, phosphorous material is present between said supporting material and said layer of γ-alumina.

The invention furthermore relates to a method for manufacturing a ceramic membrane for separating liquid and/or gas components from each other, wherein a porous layer of γ-alumina is applied to a porous layer of supporting material, characterized in that an alkali-free, phosphorous material is provided between said supporting material and said layer of γ-alumina. In one preferred embodiment, an aqueous solution of monoaluminium phosphate is applied to said supporting material, after which the membrane is slowly heated and maintained at a temperature of more than 250 degrees Celsius for at least two hours, followed by slow cooling, after which the layer of γ-alumina is applied. In this manner a stable bond is obtained.

BRIEF DESCRIPTION OF THE DRAWINGS

In order to explain the invention more fully, an embodiment thereof will now be discussed with reference to the drawing. The drawing comprises FIGS. 1 and 2, which are both schematic representations of a partial cross-section of a ceramic membrane.

DETAILED DESCRIPTION OF THE INVENTION

Figure 1:
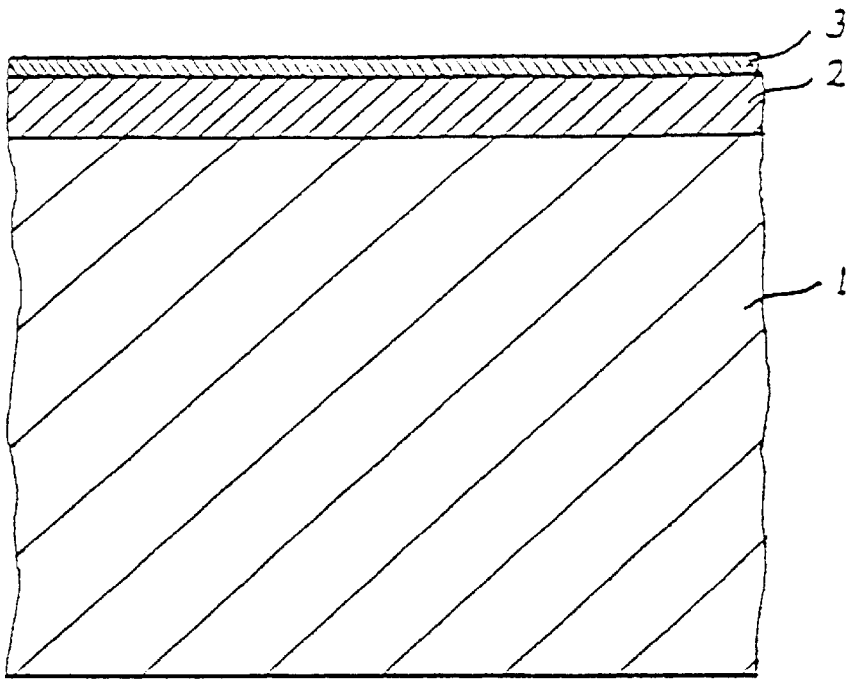
FIG. 1 shows a prior art membrane and FIG. 2 shows a membrane according to the invention.

FIG. 1, a mesoporous layer 2 of γ-alumina, preferably having a thickness of less than 100 μm, is present on top of a carrier 1 consisting of supporting material, such as α-alumina, for example, generally having a thickness of a few millimetres, by means of well-known techniques. A silica layer 3 having a thickness of a few tenths of μm may furthermore be present on top of said layer, for example, if the membrane is used as a gas separation filter. It is also possible to use titania, zirconia, silica or metal compounds rather than α-alumina for carrier 1.

The stability of the layers can be tested by means of the so-called "Scotch Tape Test". In this teat, a strip of adhesive tape is stuck to the membrane surface and torn off said surface again. If the layer possesses a good quality, it will not come loose. A membrane manufactured in the above-described manner is not stable upon coming into contact with steam, and consequently it will fail the Scotch Tape Test.

The instability of the prepared membranes under steam condition is at least partially due to the instability of the alumina layers. It has become apparent that said coming loose is caused by the poor bond between the γ-alumina layer and the α-alumina carrier.

Figure 2:
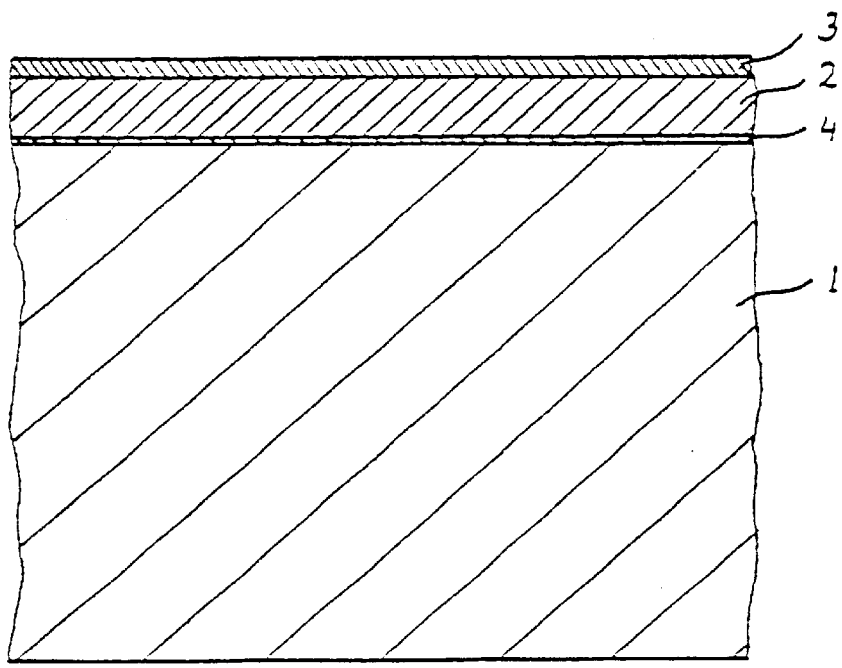

FIG. 2, A significant improvement as regards the stability is obtained by providing a binder 4 between carrier 1 and the γ-alumina layer 2, by pretreating the carrier with a diluted MAP (monoaluminium phosphate, Al $(H_2PO_4)_3$) solution prior to applying the γ-alumina layer 2. To this end, a commercially available 50% by weight MAP solution is diluted to max. a 10% MAP solution, preferably a 5% MAP solution, for example. Carrier 1 is dipped in said solution and subsequently dried in a drying cabinet, wherein the temperature is first increased by about 1° C./min. until a temperature of about 300° C. is reached, then said temperature is maintained for about 3 hours, after which it is decreased by about 1° C./min. to room temperature.

Instead of using MAP, it would also be possible to use phosphoric acid, phosphorous acid or another phosphorous, alkali-free substance.

What is claimed is:

1. A device for separating liquid and/or gas components from each other, which device includes a ceramic membrane comprising a porous layer of γ-alumina which is present on top of a porous layer of supporting material, wherein an alkali-free, phosphorous material is provided between said supporting material and said layer of γ-alumina.

2. The device according to claim 1, wherein said alkali-free, phosphorous material substantially consists of monoaluminium phosphate.

3. The device according to claim 1, wherein said supporting material comprises a compound selected from the group consisting of alumina, titania, zirconia, silica and metal compounds.

4. The device according to claim 1, wherein said porous layer of γ-alumina is provided with a porous top layer having smaller pores.

5. The device according to claim 4, wherein said porous top layer contains silica.

6. A ceramic membrane comprising a porous layer of γ-alumina which is present on top of a porous layer of supporting material, wherein an alkali-free, phosphorous material is provided between said supporting material and said layer of γ-alumina.

7. A method for separating liquid and/or gas components from each other, wherein said liquid and/or said gas is passed through a ceramic membrane comprising a porous layer of γ-alumina which is present on top of a porous layer of supporting material, wherein an alkali-free phosphorous material is present between said supporting material and said layer of γ-alumina.

8. The method according to claim 7, wherein said phosphorous material substantially consists of monoaluminium phosphate.

9. A method for manufacturing a ceramic membrane for separating liquid and/or gas components from each other, wherein a porous layer of γ-alumina is applied to a porous layer of supporting material, and wherein an alkali-free, phosphorous material is provided between said supporting material and said layer of γ-alumina.

10. The method according to claim 9, wherein said alkali-free, phosphorous material substantially consists of monoaluminium phosphate.

11. The method according to claim 9, wherein an aqueous solution of monoaluminium phosphate is applied to said supporting material, after which the membrane is slowly heated and maintained at a temperature of more than 250 degrees Celsius for at least two hours, followed by slow cooling, after which the layer of γ-alumina is applied.

* * * * *

UNITED STATES PATENT AND TRADEMARK OFFICE
CERTIFICATE OF CORRECTION

PATENT NO. : 6,632,360 B1 Page 1 of 1
DATED : October 14, 2003
INVENTOR(S) : Arian Nijmeijer et al.

It is certified that error appears in the above-identified patent and that said Letters Patent is hereby corrected as shown below:

Column 1,
Lines 25-26, "gases of" should read -- gases or --.

Column 2,
Line 45, "FIG. 1" should read -- According to FIG. 1 --.
Line 56, "teat" should read -- test --.

Column 3,
Line 1, "FIG. 2, A" should read -- A --.
Line 3, "2, by" should read -- 2, as is shown in FIG. 2, by --.

Signed and Sealed this

Eleventh Day of May, 2004

JON W. DUDAS
*Acting Director of the United States Patent and Trademark Office*